Sept. 21, 1965  H. J. SMITH  3,207,006
ROTARY WORK-SUPPORTING TABLE FOR MACHINE TOOLS AND THE LIKE
Filed May 18, 1961  4 Sheets-Sheet 1

INVENTOR
Harry John Smith

Watson, Cole, Grindle & Watson
ATTORNEYS

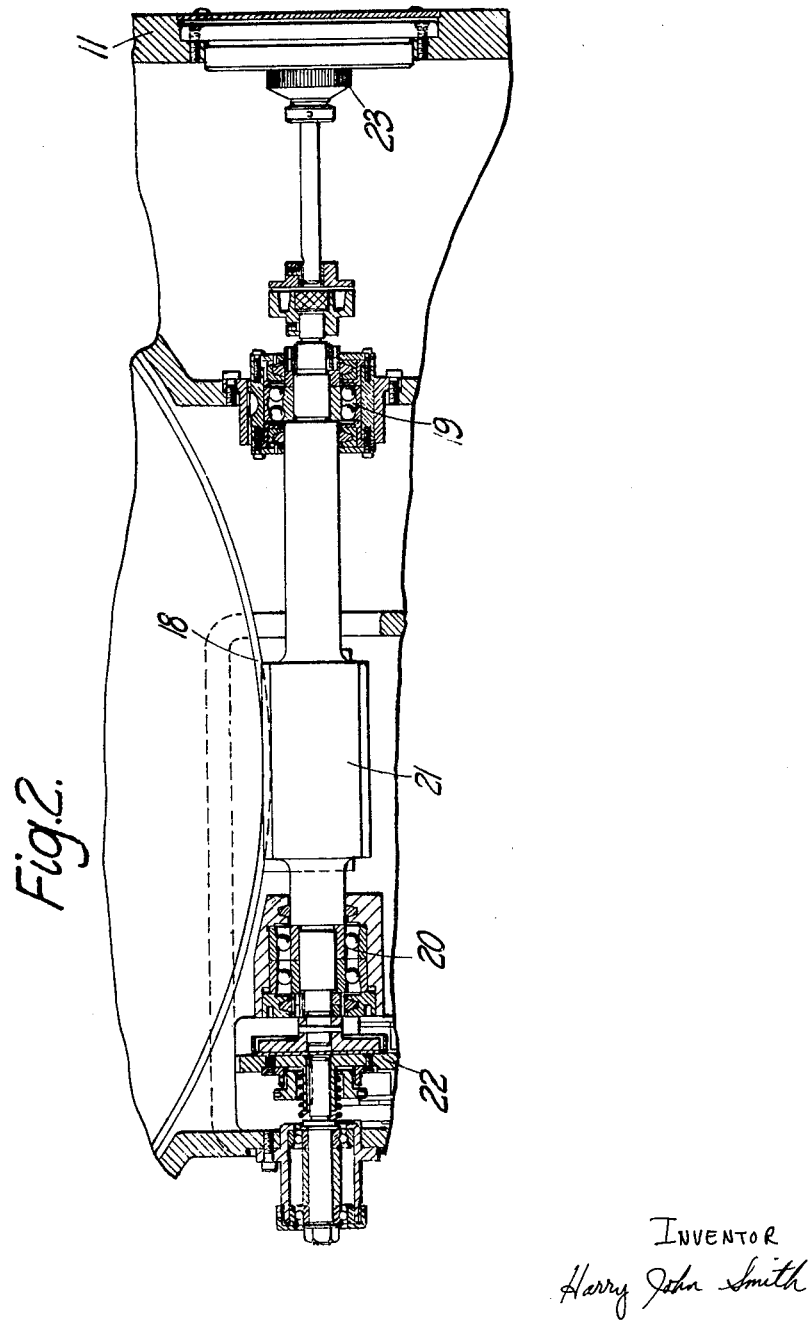

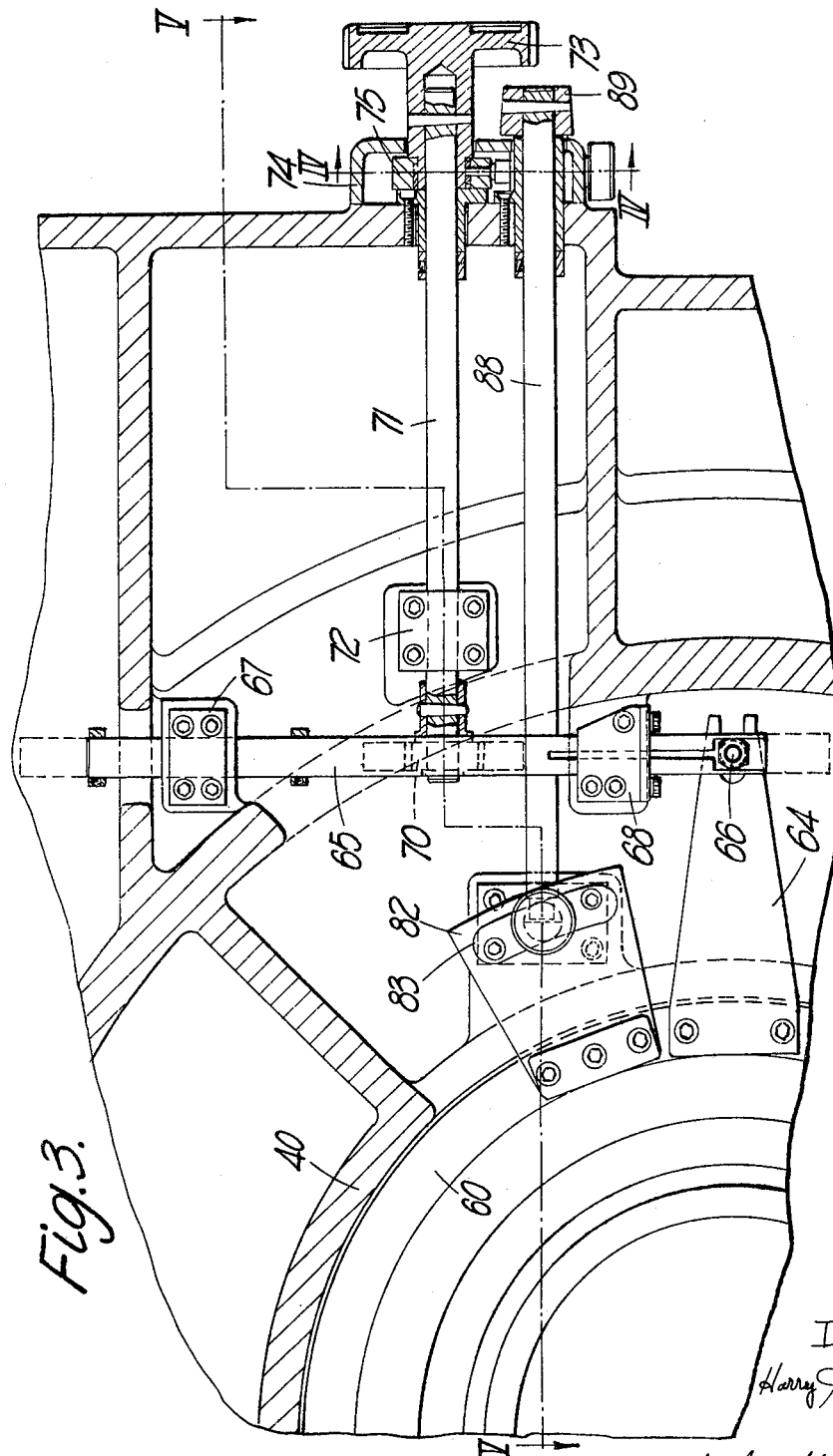

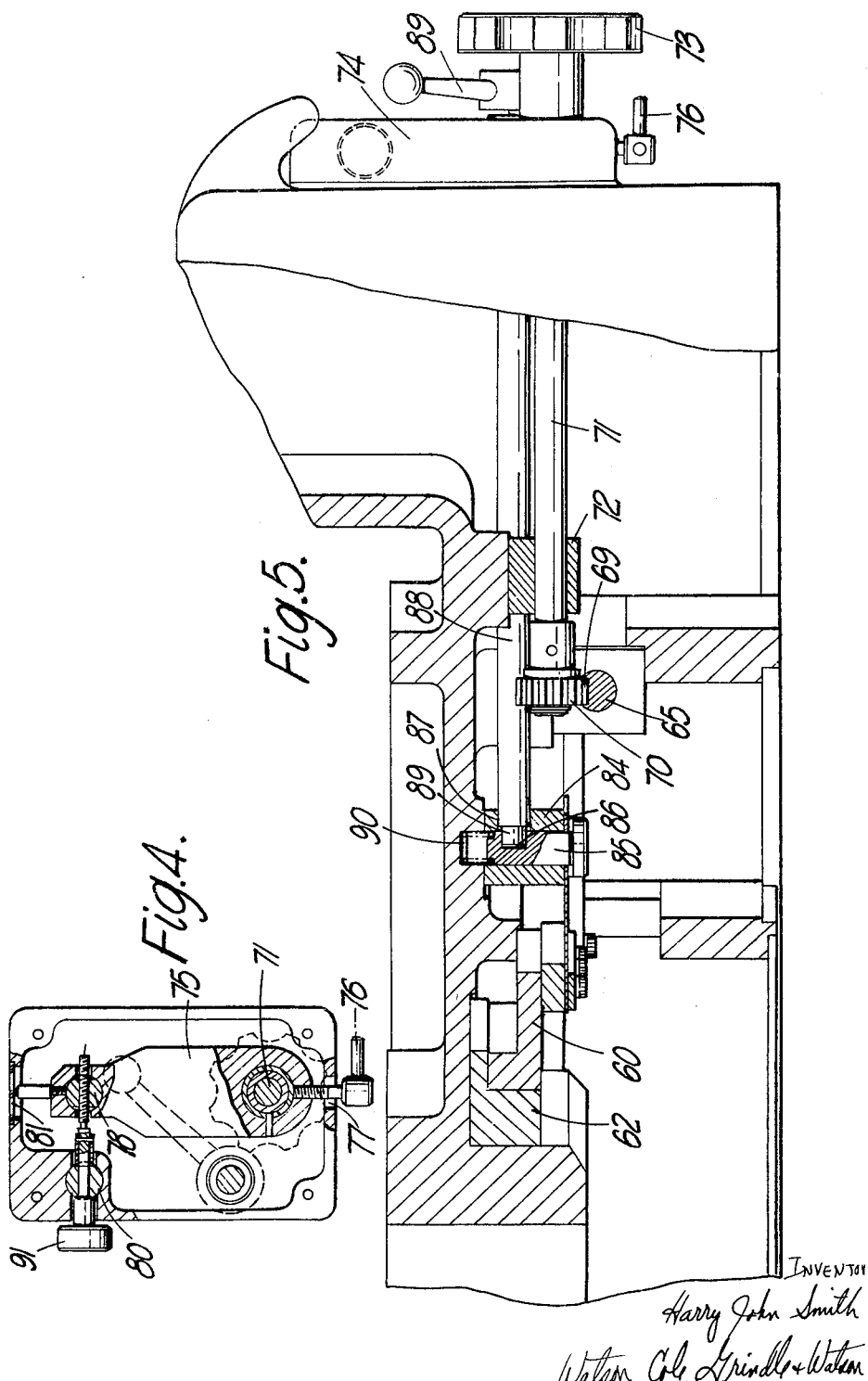

United States Patent Office 3,207,006
Patented Sept. 21, 1965

1

3,207,006
ROTARY WORK-SUPPORTING TABLE FOR MACHINE TOOLS AND THE LIKE
Harry John Smith, Maidenhead, England, assignor to Optical Measuring Tools Limited, Maidenhead, England, a British company
Filed May 18, 1961, Ser. No. 111,107
Claims priority, application Great Britain, May 20, 1960, 17,891/60
4 Claims. (Cl. 74—815)

This invention comprises improvements in or relating to a rotary work-supporting table for machine tools and the like.

Rotary tables of various designs are used for rotary indexing when machining engineering components in which the features to be machined are related with polar co-ordinates. Many tables use mechanical means for deriving angular positions and others use optical methods in which precision glass scales divided in angular units are employed as the reference scale.

The present invention relates to a table having a rotatable platen which is controlled electrically so that it can be moved automatically or by hand to predetermined positions in accordance with a programme prepared beforehand, which may, for example be expressed on a punched tape. It is possible by using two elements, one mounted on the platen and the other on the base which supports the table, and which are inductively linked together, to control the position of the table to within a second or so of arc. It will be appreciated however, that in carrying out practical work on a machine tool, while it may be desired to machine a workpiece along different lines to within an accuracy of this order, it is not possible practically to angularly position a workpiece (which may be a heavy one) relatively to the platen with such accuracy. Even approximate setting of an unmachined workpiece to an angular accuracy which permits machining of the first line or hole or face of a programme is a time-consuming operation and it is highly desirable to find means whereby rough positioning on the platen is sufficient and fine positioning can be effected afterwards without shifting the work relatively to the platen and without complicating the programming apparatus.

To this end, according to the present invention, there is provided a rotary work-supporting table for machine tools and like purposes having in combination a base, a platen rotatable upon the base, means for rotating the platen, automatic means for measuring angular movement and indicating the angular position of the platen comprising a rotor carried by the platen, a stator carried by the base upon a mounting which permits limited angular stator movement about the axis of rotation of the platen (the rotor and stator being in juxtaposition and inductively linked with one another so that movement of their relative position is signalled to an electrical table-rotation control circuit connected to a motor which governs the means for rotating the platen) and means for adjusting the angular position of the stator with an exactitude similar to that of the electrical table-rotation control, to zeroise the setting of the stator.

The following is a description by way of example of one construction of table in accordance with the present invention reference being made to the accompanying drawings in which:

FIGURE 2 is a sectional plan of part of the apparatus showing the drive to the platen;

FIGURE 3 is a plan, viewed from below of part of the apparatus partly in section showing the zero adjusting portions;

FIGURE 4 is a section through IV—IV of FIGURE 3;

FIGURE 5 is a section through V—V of FIGURE 3.

Figure 1:
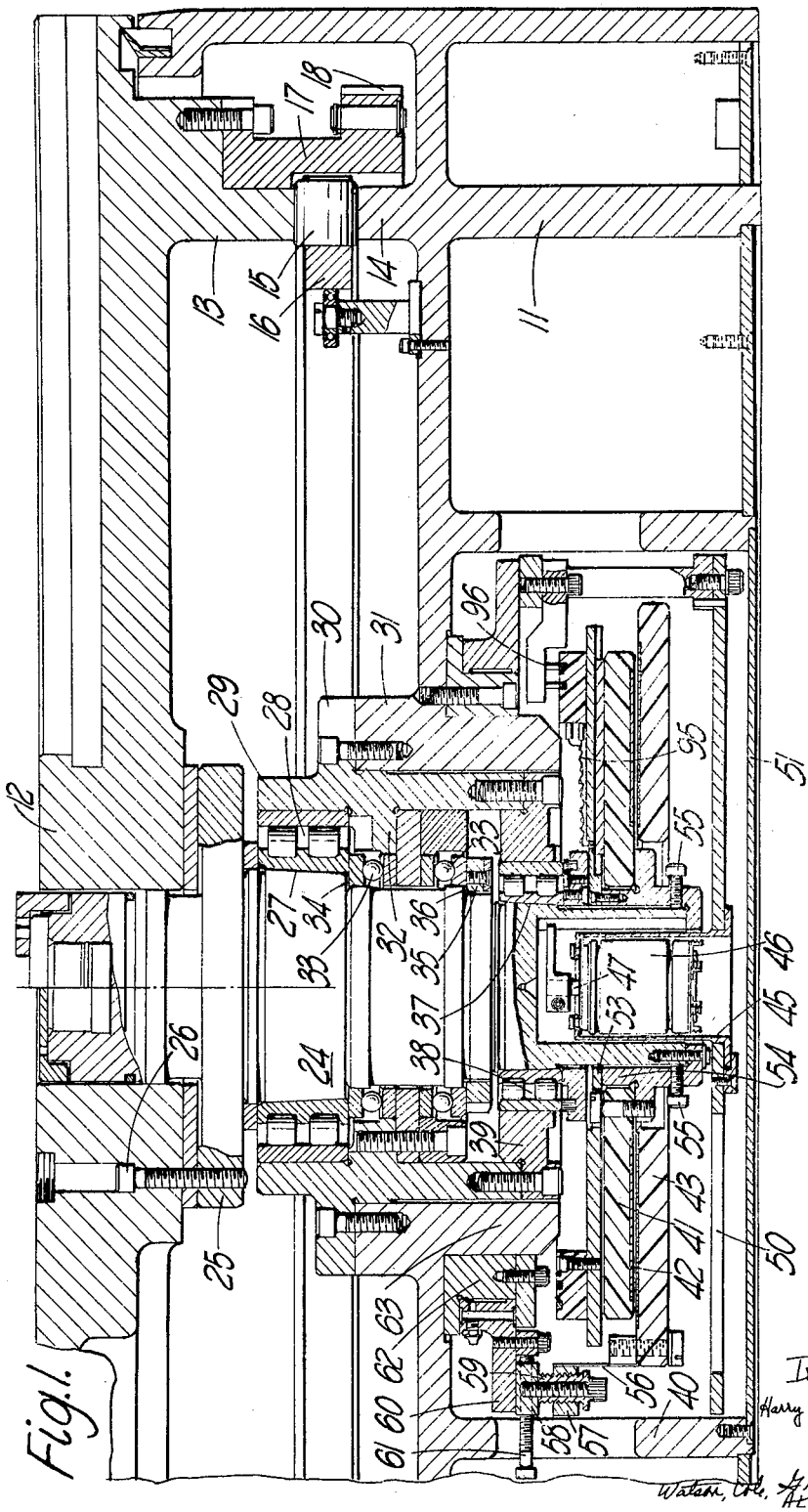
FIGURE 1 is a sectional elevation through the work supporting table in a plane including the axis of rotation of the platen with a portion cut away.

Referring to FIGURE 1 the table comprises a heavy one-piece hollow cast-iron rectangular base 11, with a large circular recess in its upper surface and a circular rotatable platen 12 which rests on the base and has on its underside a circular rib 13 to enter the recess. The bottom of the recess in the base is at about half the height of the table and contains an upwardly-facing rib 14 of the same diameter as the rib on the rotary platen. Rollers 15 in a ring-shaped cage 16 run between the two ribs 13, 14 to support the platen. Around the rib 13 is fitted a ring which carries worm-gear teeth 18, and the base supports bearings 19, 20 (FIGURE 2) for a worm 21 meshing with the worm-gear teeth 18 and driven by a small electric motor (not shown) through a gear 22. A hand-wheel 23 for rotating the worm as an alternative to the motor is also provided.

The platen 12 is maintained concentric with its roller-bearing support 14 on the base by a central vertical spindle 24 of large diameter having a flange 25 secured by set-screws 26 to the underside of the platen 12. Immediately below the flange the spindle is tapered at 27 and carries a roller-bearing race 28 fitted internally on the taper 27 but which is outwardly cylindrical and a close fit in a vertical bearing sleeve 29 fitted on the base 11 concentrically with the rib 14. The sleeve 29 has a flange 30 by which it is held down on to a machined boss 31 standing up from the centre of the bottom of the recess in the base 11. The sleeve has an internal flange 32 having secured to it the central member of a double-thrust ball-race 33 the outer members of which abut on a step 34 of the spindle and a ring 35 fixed to a step 36 of the spindle to prevent the platen rising or falling relatively to the base. Below the ball-race the spindle 24 is tapered again at 37 and carries another roller-bearing race 38 which fits in a ring 39 secured to the bottom end of the vertical bearing sleeve 29. The roller-bearings are pre-loaded to avoid play and thus the vertical spindle centralises the platen accurately although the weight is mainly taken by the large outer ring of rollers 15 between the two ribs.

Below the recess in which the platen is mounted, the base of the table is hollow and contains those parts of the automatic positioning equipment which are required to be carried on the table itself. The central part of this hollow space is surrounded by a deep circular rib 40 from top to bottom and the platen spindle 24 is extended downwardly into the space enclosed by the rib. Here it carries a flat glass ring-shaped rotor 41, on the underface of which is printed an electrical polar winding 42. Below the rotor is a stator 43 of similar shape, also printed with an electrical polar winding 44 and supported by the base in a manner hereinafter described, so as to be close to the rotor winding and inductively linked by the windings with the rotor. Electrical connections are provided and the rotor and the stator are thus inductively linked to one another and can be used to signal the position of the platen within one second of arc to an electrical control circuit (not shown), which in itself forms no part of the present invention, through wires 95 and brushes 96 which regulate the operation of the electric motor for rotating the platen. The lower end of the platen spindle 24 is hollow and provides a space for a casing 45 containing a second inductively linked rotor and stator unit 46 used for an initial rough positioning by the electrical circuit. The rotor of the unit 46 (not shown) is carried on a spindle 47 on which is an arm 48 entering a slot 49 machined in the bore in the platen spindle 24 so that this rotor is rotated with the platen. This stator is held from rotation by a spider 50 spanning the underside of the space within the large circular rib 40 and secured indirectly to the base 11 of the machine, as hereinafter described. Below all these parts the space is closed in by a bottom plate 51 screwed to the circular rib 40. The flat plates which carry the printed circuits will be hereinafter referred to as the inductosyn rotor and the inductosyn stator. The inductosyn rotor is gripped directly between flanges 52, 53 on a built up hub 54 carried by the platen spindle. The hub has a little play betwen its bore and the exterior of the spindle and centralising screws 55 are provided in the hub to enable the rotor to be centralised exactly. The stator is carried on three vertical flat spring members 56 which extend upwardly equidistantly from three points around its edge and are secured at their upper ends to the interior of a supporting-ring 57. With a view to bringing the stator into a position in which it is accurately parallel to the rotor, the supporting-ring is connected to an intermediate ring 58 close above it by means of screwed posts 59 at three points. In order to ensure that the stator can be centralised relative to the rotor, the intermediate ring is connected to a carrier ring 60 by three radial adjustment screws 61. The carrier-ring is mounted for rotation around a flanged bearing-ring 62 fitted to a downwardly projecting circular rim 63 which surrounds the bearing-sleeve of the platen spindle and is integral with the casing 11.

Referring to FIGURE 3 the carrier-ring 60 has secured to its underside at one point a radial arm 64 and this arm projects through an opening in the circular rib 40 into engagement with the end of a slidable adjustment rack 65, set tangentially to the movement of the arm so that movement of the rack will adjust the position of the carrier ring and with it, the assembly of rings which supports the inductosyn stator. The arm 64 is forked and engages a pin 66 projecting from the rack. The rack consists of a round rod sliding in bearings 67, 68 and its central portion is cut away and provided with rack teeth 69 (FIGURE 5) which are engaged by a pinion 70 on the end of a spindle 71 which passes through a bearing 72 and carries a hand-wheel 73 at its outer end. Thus rotation of the hand-wheel will alter the zero setting of the carrier ring and with it that of the inductosyn stator.

The rotation of the hand-wheel 73 affords only a rough adjustment and, in order to get a fine adjustment, a small casing 74 is secured to the outside of the table base 11 around the hand-wheel spindle 71. In the casing 74, upon the hub of the hand-wheel, there is rotatably mounted a lever 75 best seen in FIGURE 4 which can be secured to the hub of the hand-wheel 73 by means of a clamping screw 76, the stem of which passes through a slot 77 in the underside of the case. The lever 75 extends upwardly within the casing 74 and at its upper end carries a trunnion 78 which is screw-threaded to receive the end of an adjusting screw 79. The stem of the adjusting screw rotates in another trunnion 80 and passes through the side wall of the casing 74 to the exterior, where it carries a knurled head 91. Therefore if the lever 75 is locked to the hub of the hand-wheel 73 the adjusting screw 79 can be used to give the lever a fine movement which will afford a very delicate adjustment to the carrier ring 60 and the inductosyn stator which it supports. An index on the end of the lever operates just below a window 81 in the top of the casing.

In order to ensure that there is no back-lash between the pinion and the rack, the pinion is split into two halves which are connected by a strong circlip-type spring so that the teeth of one half of the pinion are normally slightly out of line with the teeth of the other half and take up any backlash which might otherwise exist at the meshing point.

A second arm 82 (FIGURE 3) made of thin springy metal projects laterally from the underside of the carrier-ring 60 and at a suitable radius from the centre of the ring it is pierced with a curved slot 83 concentric with the ring 60. This springy arm bears against the underside of a lug 84 located beneath the floor of the recess in the base 11 and through the slot there passes a headed locking stud 85. Within the lug the stud has a lateral opening 86 which is approximately in line with a lateral opening 87 in the wall of the lug. A locking spindle 88 fits in the lateral opening in the wall of the lug and carries an eccentric 89 which will serve to move the locking stud 85 so that it grips the spring arm 82 tightly if the locking spindle 88 is suitably rotated. The locking spindle passes to the exterior of the table base 11, where it carries a locking lever 89. The locking stud is urged away from the locking position by a helical spring 90 which bears against its end.

The free movement which the rack 69 is able to give to the carrier-ring 60 when the latter is unlocked, is about 5° on either side of its central position. Therefore, if any workpiece is placed upon the table within 5° of its desired position, the zero of the inductosyn stator can be adjusted to correspond with the exact actual position of the workpiece.

I claim:
1. A rotary work-supporting table for machine tools and like purposes comprising in combination a base, a table rotatably mounted on the base, means for rotating the table, means for electrically measuring the rotational position of the table comprising an electric polar rotor secured to the table, an electric polar stator in inductive relation to the rotor, a supporting element for the stator rotatably mounted on the base so that it can be moved about the same axis as the base and hand-operable adjusting means for adjusting the supporting element about the said axis to a high degree of accuracy, to permit adjustment of said stator to a predetermined zero position of rotation, said last-mentioned adjusting means comprising a rotatable handle operatively connected to the stator, a lever operatively lockable to said handle, and screw adjustment means to rotate the handle and lever together to provide a fine adjustment for the handle.

2. A rotary work supporting table as claimed in claim 1 wherein the rotatable handle is operatively connected to the stator through a pinion meshed with rack teeth on a sliding member.

3. A rotary table as claimed in claim 1 wherein means are provided for clamping the table in the adjusted position comprising a flexible plate carried by the table and extending in a plane which is parallel to the direction of its movement, a pair of clamping members to bear on opposite faces of the plate and means for bringing them together, the construction being such that the clamping members are held from movement other than at right angles to the plate, said last-mentioned adjusting means comprising a rotatable handle operatively connected to the stator, a lever operatively lockable to said handle, and screw adjustment means to rotate the handle and lever together to provide a fine adjustment for the handle.

4. A rotary table as claimed in claim 3 wherein the clamping members comprise a fixed block having a face which bears on one face of the flexible plate and a headed pin sliding through the fixed block and having a head which bears on the other side of the flexible plate from that on which the fixed block bears.

References Cited by the Examiner

UNITED STATES PATENTS

| | | | |
|---|---|---|---|
| 2,066,131 | 12/36 | White | 74—125.5 |
| 2,440,916 | 5/48 | Rusuak | 74—815 X |
| 2,490,044 | 12/49 | Garbarini et al. | 74—125.5 |
| 2,611,969 | 9/52 | Hrcek | 74—813 |
| 2,823,326 | 2/58 | Gerty | 74—5.6 X |
| 2,871,727 | 2/59 | Malick | 74—813 |
| 2,965,824 | 12/60 | Hirtreiter | 74—142 X |
| 3,031,902 | 5/62 | Parske. | |

BROUGHTON G. DURHAM, *Primary Examiner.*

DON A. WAITE, *Examiner.*